United States Patent [19]

Murai et al.

[11] Patent Number: 4,903,016
[45] Date of Patent: Feb. 20, 1990

[54] COMMUNICATION CONTROL UNIT

[75] Inventors: Toshiharu Murai, Kawasaki; Akio Matsubara, Yokohama, both of Japan

[73] Assignee: Ricoh Company, Ltd., Tokyo, Japan

[21] Appl. No.: 215,414

[22] Filed: Jul. 5, 1988

[30] Foreign Application Priority Data

Jul. 7, 1987 [JP] Japan .................. 62-167791
Jul. 9, 1987 [JP] Japan .................. 62-169708
Apr. 13, 1988 [JP] Japan .................. 63-89284

[51] Int. Cl.$^4$ .......................... G08C 17/00; H04J 3/16
[52] U.S. Cl. ........................ 340/825.070; 370/18;
  370/5.3; 370/92; 370/63; 375/8; 340/825.5
[58] Field of Search ............... 370/18, 53, 92, 94,
  370/63; 340/825.07, 825.5; 178/69 R; 375/36,
  8–10

[56] References Cited
U.S. PATENT DOCUMENTS 3,903,507  9/1975  Dillingham ................... 370/53
4,704,716 11/1987  Bowers et al. ................ 370/63
4,785,465 11/1988  Lang et al. ................... 375/8

Primary Examiner—Donald J. Yusko
Assistant Examiner—Yuk H. Lau
Attorney, Agent, or Firm—Oblon, Spivak, McClelland, Maier & Neustadt

[57] ABSTRACT

A communication control unit controls communication between a terminal and a communication network employing a multi-conjunction architecture, and comprises a transmitter/receiver for transmitting and receiving a signal to and from the communication network, a switch part for enabling signal transmission and reception between the terminal and the communication network through the transmitter/receiver in a first state and for disabling the signal transmission and reception between the terminal and the communication network through the transmitter/receiver in a second state, and a control part comprising a signal detecting circuit for detecting whether or not a signal received from the communication network through the transmitter/receiver is intended for the terminal coupled to the communication control unit. The control part controls the switch part to the first state when the signal detecting circuit detects that the signal received from the communication network through the transmitter/receiver is intended for the terminal coupled to the communication control unit.

16 Claims, 11 Drawing Sheets

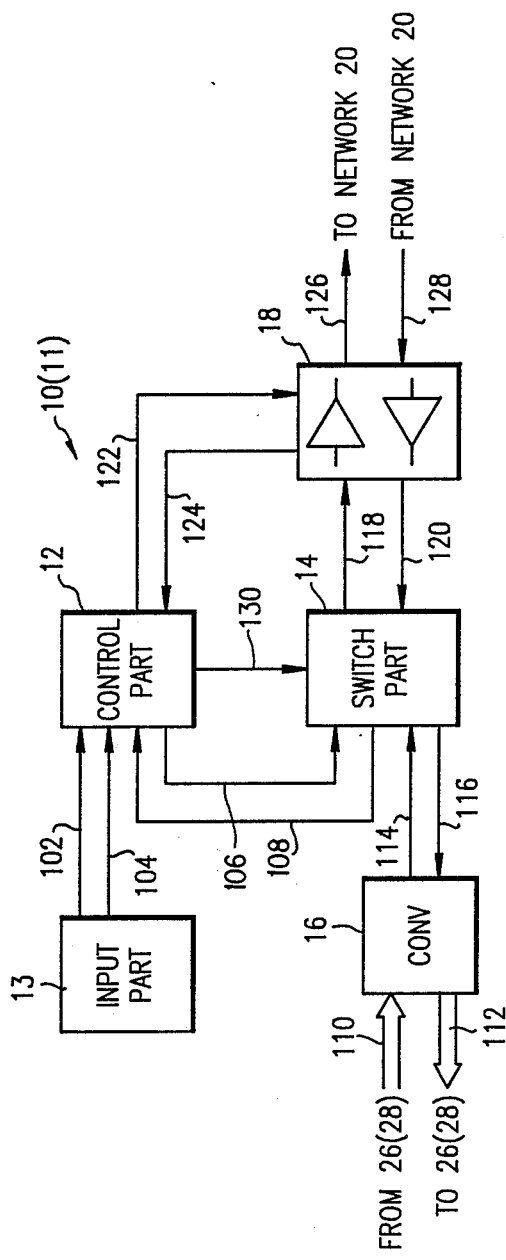
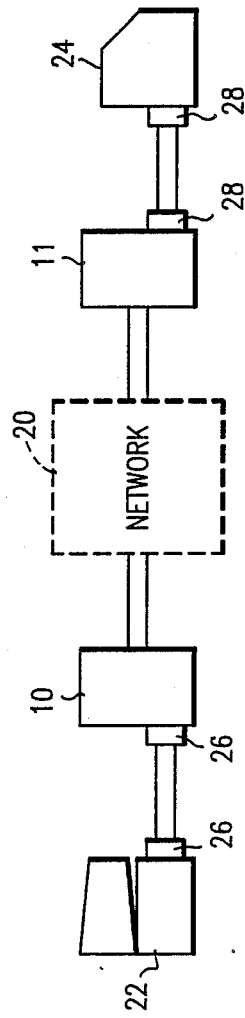
FIG. 1
FIG. 2

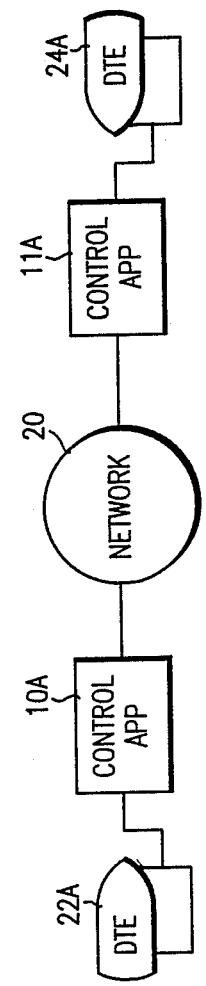

COMMUNICATION CONTROL UNIT

BACKGROUND OF THE INVENTION

The present invention generally relates to communication control units, and more particularly to a communication control unit for controlling a communication made through a communication network employing a multi-conjunction architecture.

Conventionally, as communication networks applicable to local area networks (LANs), there are a network employing a carrier sense multiple access with collision detection (CSMA/CD) method using coaxial cables for buses as typified by an Ethernet (registered trademark), an optic star shaped network using optical fibers for buses, and an optic loop shaped network employing a time-division multiple access (TDMA) method. The network using optical fibers is less affected by noise caused by external electromagnetic waves when compared to the network using coaxial cables.

In the network using buses such as the Ethernet, a fault in a node apparatus will not cause the entire system to go down, but the entire system will go down when a node apparatus oscillates or a cable breaks. In the case of the star shaped network, the entire system will go down when a fault occurs in a central part of the network. Furthermore, in the case of the loop shaped network, there is a possibility of the entire system going down when a fault occurs in a node apparatus or a link. It is possible to provide the loop in duplicate, but it would make the construction of the node apparatus extremely complex.

Accordingly, a lattice communication network analogous to nerve cells of a living body has been previously proposed in a U.S. Pat. No. 4,516,272. According to this proposed lattice network, each node apparatus has a plurality of input and output channels and is used as a communication control element, and such node apparatuses are coupled in a multi-conjunction to constitute the lattice network. Each node apparatus transfers one of incoming digital signals according to a first-come-first-served logic (hereinafter referred to as a first-come-first-output logic).

The proposed lattice network has a large degree of freedom of network topology because of the multi-conjunction architecture. Thus, the survivability of data is high. In other words, even when a fault occurs in a path of the network, it is possible to carry out the communication through other paths. Furthermore, it is possible to select optimum paths for the communication because each node apparatus transfers the incoming digital signals according to the first-come-first-output logic.

In the lattice communication network in which a communication may continuously occupy in time a part or all of the communication network, a terminal coupled to the communication network must send through the communication network a communication request signal intended for a destination terminal. A terminal which receives the communication request signal must discriminate whether or not the communication request signal is intended therefor, and the terminal must send an acknowledge signal when the received communication request signal is intended therefor. In addition, the terminal which sends the communication request signal and the terminal which receives the communication request signal and sends the acknowledge signal must fix a communication path therebetween in the communication network.

For this reason, each terminal in the lattice communication network requires an interface having a function of recognizing an address, so that the terminal can discriminate whether or not the received communication request signal is intended therefor. However, a standard interface which is commonly available and generally used does not have the concept of address. Hence, there is a problem in that the standard interface cannot be used in the communication network employing the multi-conjunction architecture.

Because the standard interface does not have the concept of address, it is impossible to discriminate whether or not a communication release instruction signal received after a communication path is fixed in the communication network is intended therefor even when an attempt is made to use the standard interface in the communication network employing the multi-conjunction architecture. Consequently, it is impossible to effectively release the fixed communication path after the communication is ended so as to open the communication network for other communications.

On the other hand, when a communication control unit is to be used with a plurality of interfaces, it is necessary to provide a number of communication control units in correspondence with the number of interfaces. As a result, a large space is required to set up the communication control units, and a power source having a large capacity is required. Furthermore, the communication control unit must be designed independently for each kind of interface, and there is a problem in that it takes considerable time and effort to design the communication control units for the various kinds of interfaces.

SUMMARY OF THE INVENTION

Accordingly, it is a general object of the present invention to provide a novel and useful communication control unit in which the problems described heretofore are eliminated.

Another and more specific object of the present invention is to provide a communication control unit which makes it possible to use in a communication network employing a multi-conjunction architecture a terminal which only comprises a standard interface.

Still another object of the present invention is to provide a communication control unit for controlling signal transmission and reception between a terminal and a communication network employing a multi-conjunction architecture, comprising transmitter/receiver means for transmitting a signal to and for receiving a signal from the communication network, switch means for enabling signal transmission and reception between the terminal and the communication network through the transmitter/receiver means in a first state and for disabling the signal transmission and reception between the terminal and the communication network through the transmitter/receiver means in a second state, and control means comprising signal detecting means for detecting whether or not a signal received from the communication network through the transmitter/receiver means is intended for the terminal coupled to the communication control unit, where the control means controls the switch means to the first state when the signal detecting means detects that the signal received from the communication network through the transmitter/receiver means is intended for the terminal coupled to the communication control unit. According to the communication control unit of the present invention, the coupling between the terminal and the communication network is controlled by the switch means, and it is thus unnecessary to use a special interface having the concept of address. In other words, a standard interface can be used to couple the terminal and the communication control unit which couples the terminal to the communication network.

A further object of the present invention is to provide a communication control unit which selectively couples one of a plurality of terminals to a communication network employing the multi-conjunction architecture.

Another object of the present invention is to provide a communication control unit for controlling signal transmission and reception between a plurality of terminals and a communication network employing a multi-conjunction architecture, comprising transmitter/receiver means for transmitting a signal to and for receiving a signal from the communication network, switch means for enabling signal transmission and reception between a selected one of the terminals and the communication network through the transmitter/receiver means in a first state and for disabling the signal transmission and reception between the selected one of the terminals and the communication network through the transmitter/receiver means in a second state, and control means comprising selecting means for selecting a desired one of the terminals coupled to the communication control unit and signal detecting means for detecting whether or not a signal received from the communication network through the transmitter/receiver means is intended for the selected one of the terminals coupled to the communication control unit, where the control means controls the switch means to the first state when the signal detecting means detects that the signal received from the communication network through the transmitter/receiver means is intended for the selected one of the terminals coupled to the communication control unit. According to the communication control unit of the present invention, it is possible to control the coupling of the plurality of terminals to the communication network by a single communication control unit, thereby considerably enlarging the application of the communication network.

Other objects and further features of the present invention will be apparent from the following detailed description when read in conjunction with the accompanying drawings.

BRIEF DESCRIPTION OF THE DRAWINGS

FIG. 1 is a system block diagram generally showing a first embodiment of the communication control unit according to the present invention;

FIG. 2 is a system block diagram showing a communication system applied with the first embodiment;

FIG. 13 shows an embodiment of a signal format of the signal which is transmitted and received through the communication network; and FIG. 14 is a system block diagram showing a communication system applied with the fifth embodiment.

DETAILED DESCRIPTION

Figure 3:
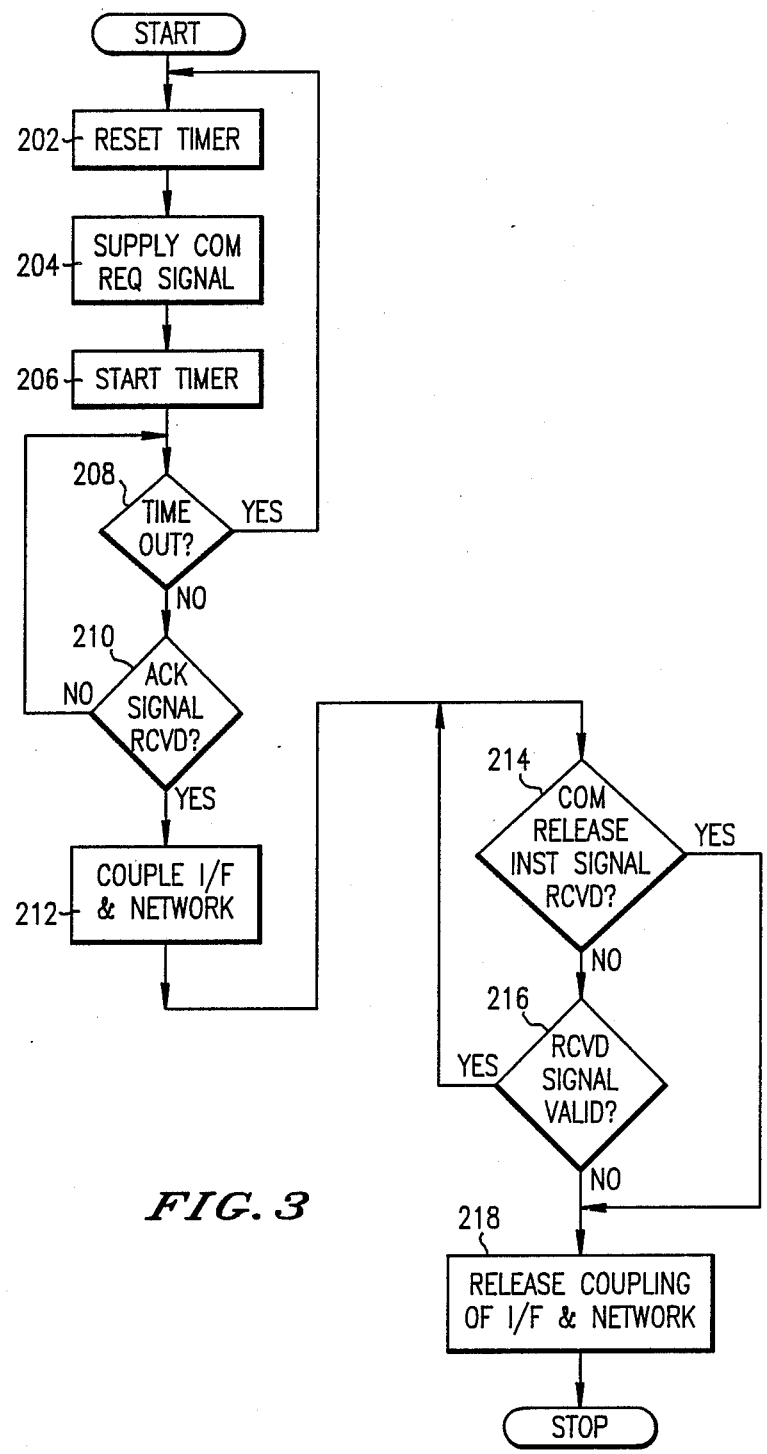
FIG. 3 is a flow chart for explaining the operation of a communication control unit of the communication system shown in FIG. 2.

FIG. 1 generally shows a first embodiment of the communication control unit according to the present invention. A communication control unit 10 (or 11) comprises a control part 12, an input part 13, a switch part 14, a converting circuit 16, and a transmitter/receiver 18.

The control part 12 is coupled to the input part 13 through signal lines 102 and 104. The input part 13 supplies to the control part 12 a communication request instruction signal through the signal line 102 and a communication release instruction signal through the signal line 104. The control part 12 is also coupled to the switch part 14 through signal lines 106, 108 and 130. The control part 12 supplies a communication request signal or an acknowledge signal to the switch part 14 through the signal line 106, and receives from the switch part 14 a communication request signal or an acknowledge signal through the signal line 108. The protocol of the communication request signal and the acknowledge signal does not have to coincide with the protocol. of the communication after the communication path is fixed. The control part 12 also supplies a control signal to the switch part 14 through the signal line 130, and this control signal is used to control the connection of the switch part 14.

The switch part 14 is coupled to the converting circuit 16 through signal lines 114 and 116. A serial bit stream signal from the converting circuit 16 is supplied to the switch part 14 through the signal line 114. This serial bit stream signal is obtained by converting parallel output signals of a standard interface (not shown) in the converting circuit 16. The switch part 14 also supplies the serial bit stream signal t the converting circuit 16 through the signal line 116, and the serial bit stream signal is converted into parallel output signals in the converting circuit 16 and supplied to the standard interface.

It is not essential that the converting circuit 16 carry out a serial-to-parallel (S/P) conversion and a parallel-to-serial (P/S) conversion. Depending on the kind of standard interface use, no S/P conversion nor P/S conversion is required, and it is simply necessary to convert the signal level.

The converting circuit 16 is coupled to the standard interface through signal lines 110 and 112. Hence, in the present embodiment, the converting circuit 16 converts the parallel output signals of the standard interface received through the signal line 110 into the serial bit stream signal, and supplies the bit stream signal to the switch part 14 through the signal line 114. The converting circuit 16 also converts the serial bit stream signal received from the switch part 14 through the signal line 116 into the parallel output signals, and the parallel output signals are supplied to the standard interface through the signal line 112.

The switch part 14 is coupled to the transmitter/receiver 18 through signal lines 118 and 120. The switch part 14 supplies a signal which is to be supplied to a communication network 20 shown in FIG. 2 to the transmitter/receiver 18 through the signal line 118. In addition, the signal from the communication network 20 is obtained from the transmitter/receiver 18 and is received by the switch part 14 through the signal line 120. A description on the communication network 20 will be described later in conjunction with FIG. 2.

The transmitter/receiver 18 is coupled to the communication network 20 through signal lines 126 and 128 and functions as an interface between the communication network 20 and the communication control unit 10 (or 11). An output signal of the transmitter/receiver 18 is supplied to the communication network 20 through the signal line 126, and an input signal of the transmitter/receiver 18 is obtained from the communication network 20 through the signal line 128.

The transmitter/receiver 18 is also coupled to the control part 12 through signal lines 122 and 124. A control signal for controlling a transmitter part of the transmitter/receiver 18 to enabled and disabled states is supplied to the transmitter/receiver 18 from the control part 12 through the signal line 122. In addition, a carrier detection signal for indicating whether or not an input signal to a receiver part of the transmitter/receiver 18 is in conformance with a set standard is supplied to the control part 12 from the transmitter/receiver 18 through the signal line 124. For example, the carrier detection signal indicates whether or not the input signal to the receiver part of the transmitter/receiver 18 is correctly in conformance with the Manchester encoding.

FIG. 2 shows a communication system applied with the first embodiment. The communication control unit 10 is coupled to a computer 22 which is used as a terminal through input/output parts 26 of the standard interface. The communication control unit 11 having the same construction as the communication control unit 10 is coupled to a printer 24 which is used as a terminal through input/output parts 28 of the standard interface. The communication control units 10 and 11 are coupled to the communication network 20.

The input/output parts 26 and 28 of the standard interfaces are input/output parts of commonly available interfaces which are generally used and have no concept of address. Examples of the standard interfaces are data terminal equipments (DTEs) and data circuit terminating equipments (DCEs) such as the RS232C, RS422 and Centronics.

The communication network 20 in the present embodiment is a communication network employing the multi-conjunction architecture having a plurality of transmission paths each coupling one node apparatus to another node apparatus or a terminal. The node apparatuses are used as communication control elements, and each node apparatus transfers one of incoming digital signals according to the first-come-first-output logic. The communication network 20 per se is further disclosed in the U.S. Patent Application Ser. No. 096,532 filed Sept. 15, 1987, U.S. Pat. No. 4,839,887, the disclosure of which is hereby incorporated by reference.

Figure 4:
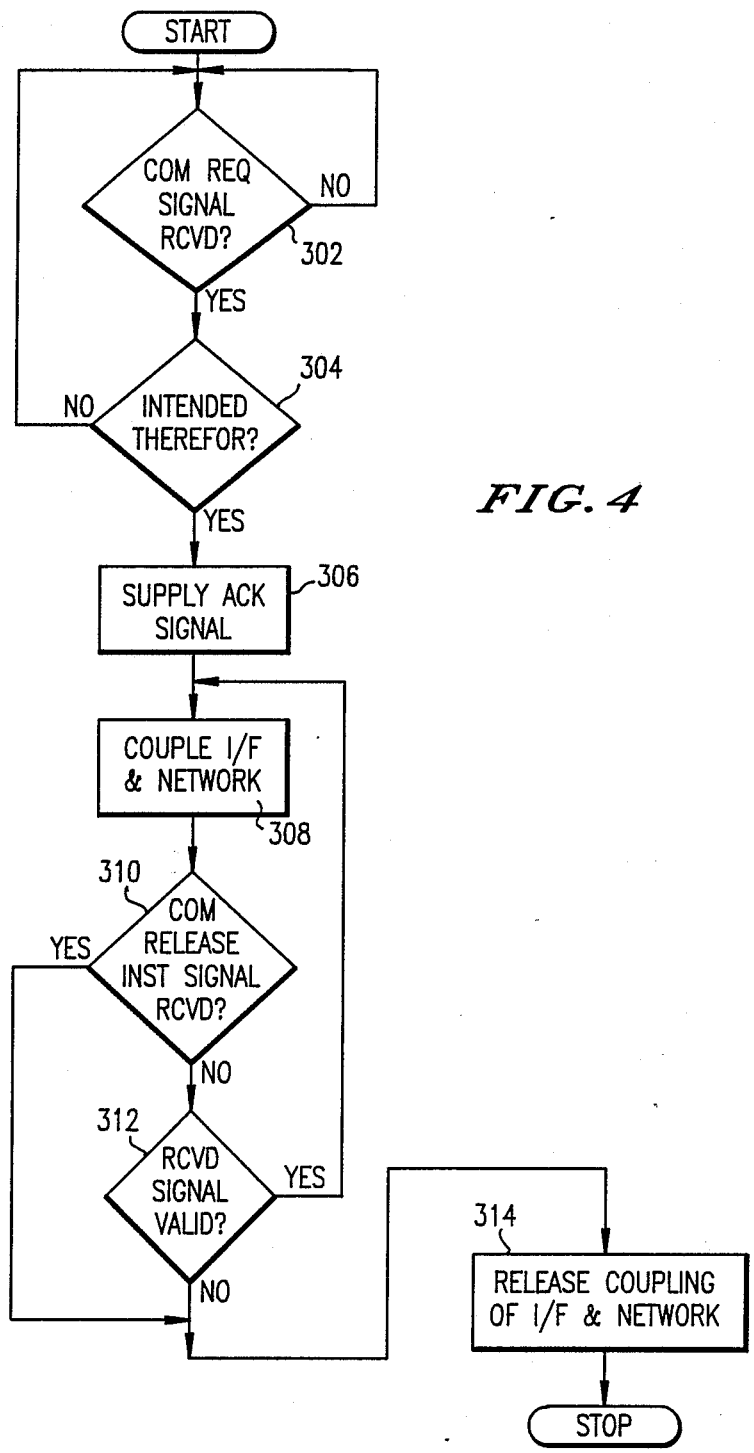
FIG. 4 is a flow chart for explaining the operation of another communication control unit of the communication, system shown in FIG. 2.

Next, a description will be given on the switching operation of the switch part 14 of the communication control unit by referring to FIGS. 2 through 4. The description will be given for the case where a communication is made from the computer 22 to the printer 24 shown in FIG. 2. Hence, a communication path is fixed by sending a communication request signal from the communication control unit 10 to the communication control unit 11. FIG. 3 is a flow chart for explaining the operation of the communication control unit 10, and FIGS. 4 is a flow chart for explaining the operation of the communication control unit 11.

In FIG. 2, a communication request instruction signal from the input part 13 is received by the control part 12 of the communication control unit 10. This communication request instruction signal is supplied to the control part 12 through the signal line 102 shown in FIG. 1. When the control part 12 of the communication control unit 10 receives the communication request instruction signal, a step 202 shown in FIG. 3 resets an internal timer (not shown) of the control part 12, and a step 204 supplies a communication request signal to the switch part 14 through the signal line 106. A step 206 starts the timing operation of the internal timer when the communication request signal is supplied to the switch part 14.

In this state, the switch part 14 of the communication control unit 10 connects the signal lines 106 and 108 to the signal lines 118 and 120, respectively. Accordingly, the communication request signal supplied to the switch part 14 from the control part 12 through the signal line 106 is supplied to the transmitter part of the transmitter/receiver 18 through the signal line 118. The control part 12 also supplies an enable signal to the transmitter part of the transmitter/receiver 18 through the signal line 122 to put the transmitter part in an enabled state. Hence, the communication request signal supplied to the transmitter/receiver 18 through the signal line 118 is subjected to a necessary signal processing such as encoding in the transmitter/receiver 18 and is supplied to the communication network 20 shown in FIG. 2 from the transmitter part through the signal line 126.

The communication request signal supplied to the communication network 20 is received by the communication control unit 11. In the communication control unit 11, the communication request signal is supplied to a receiver part of the transmitter/receiver 18 through the signal line 128 shown in FIG. 1. When the receiver part of the transmitter/receiver 18 detects that the received communication request signal is in conformance with a set standard, the receiver part supplies a carrier detection signal to the control part 12 through the signal line 124.

The receiver part of the transmitter/receiver 18 of the communication control unit 11 also supplies data received from the communication network 20 to the switch part 14 through the signal line 120. In the case where the data received from the communication network 20 is subjected to the necessary signal processing such as the encoding, the receiver part returns the data back into the original format before supplying the data to the switch part 14.

In this state, the switch part 14 of the communication control unit 11 connects the signal lines 106 and 108 to the signal lines 118 and 120, respectively. Hence, the communication request signal supplied to the switch part 14 through the signal line 120 is supplied from the switch part 14 to the control part 12 through the signal line 108.

In FIG. 4, a step 302 discriminates whether or not the communication request signal is received. When the discrimination result in the step 302 becomes YES, a step 304 discriminates whether or not the received communication request signal is intended therefor, that is, intended for the communication control unit 11. The process returns to the step 302 when the discrimination result in the step 304 is NO. But when the discrimination result in the step 304 is YES, a step 306 supplies an acknowledge signal to the switch part 14 through the signal line 106. Since the switch part 14 connects the signal lines 106 and 108 to the signal lines 118 and 120, respectively, the acknowledge signal received by the switch part 14 is supplied to a transmitter part of the transmitter/receiver 18 through the signal line 118. Furthermore, in addition to the generation of the acknowledge signal, the control part 12 supplies an enable signal to the transmitter part of the transmitter/receiver 18 through the signal line 122 to put the transmitter part in an enabled state. Thus, the acknowledge signal supplied to the transmitter part of the transmitter/receiver 18 is subjected to the necessary signal processing such as encoding and is supplied to the communication network 20 through the signal line 126.

After supplying the acknowledge signal to the switch part 14, the control part 12 of the communication control unit 11 supplies to the switch part 14 a control signal for switching over the connection of the switch part 14 through the signal line 130. Responsive to this control signal, the switch part 14 switches over and connects the signal lines 118 and 120 to the signal lines 114 and 116, respectively. Accordingly, in a step 308, the communication control unit 11 shown in FIG. 2 completes the coupling of the input/output part 28 of the standard interface and the communication network 20.

On the other hand, in the communication control unit 10, the acknowledge signal from the communication network 20 is supplied to a receiver part of the transmitter/receiver 18 through the signal line 128. The receiver part outputs a carrier detection signal when it is discriminated that the received acknowledge signal is in conformance with the set standard, and this carrier detection signal is supplied to the control part 12 through the signal line 124.

The receiver of the transmitter/receiver 18 also supplies the data received from the communication network 20 to the switch part 14 through the signal line 120.

In this state, the switch part 14 of the communication control unit 10 still connects the signal lines 106 and 108 to the signal lines 118 and 120, respectively. Accordingly, the acknowledge signal supplied to the switch part 14 through the signal line 120 is supplied to the control part 12 from the switch part 14 through the signal line 108.

In FIG. 3, a step 208 discriminates whether or not a predetermined time has expired in the internal timer of the control part 12. The process returns to the step 202 when the discrimination result in the step 208 is YES. When the discrimination result in the step 208 becomes NO, a step 210 discriminates whether or not the acknowledge signal is received. The process returns to the step 208 when the discrimination result in the step 210 is NO. On the other hand, when the discrimination result in the step 210 is YES, a step 212 couples the input/output part 26 of the standard interface and the communication network 20. In other words, when the discrimination result in the step 210 is YES, the control part 12 supplies a control signal to the switch part 14 through the signal line 130 so as to switch over the connection of the switch part 14. As a result, the switch part 14 connects the signal lines 118 and 120 to the signal lines 114 and 116, respectively, responsive to the control signal. The coupling of the input/output part 26 of the standard interface and the communication network 20 is hence completed.

When the operations described heretofore are ended, the standard interface having the input/output part 26 coupled to the computer 22 shown in FIG. 2 is coupled to the communication network 20 through the communication control unit 10, and standard interface having the input/output part 28 coupled to the printer 24 is coupled to the communication network 20 through the communication control unit 11. Therefore, it becomes possible to carry out a network communication between the computer 22 and the printer 24 through the communication network 20.

Next, a description will be given on the operation of releasing the fixed communication path. When releasing the fixed communication path for other communications, a communication release instruction signal is supplied to the control part 12 of the communication control unit 10 shown in FIG. 2 by manipulating the input part 13. This communication release instruction signal is supplied to the control part 12 through the signal line 104 shown in FIG. 1. When the control part 12 receives the communication release instruction signal, the control part 12 supplies a disable signal to the transmitter part of the transmitter/receiver 18 through the signal line 122 to put the transmitter part in a disabled state.

In addition, the control part 12 supplies a control signal to the switch part 14 through the signal line 130 so as to switch over the connection of the switch part 14. Hence, the switch part 14 is returned to the initial state where the signal lines 118 and 120 are connected to the signal lines 106 and 108, respectively. Thus, the communication control unit 10 releases the coupling of the input/output part 26 of the standard interface and the communication network 20.

When the control part 12 receives no communication release instruction signal but an active carrier signal is no longer received from the communication network 20 through the transmitter/receiver 18, the control part 12 supplies a control signal to the switch part 14 so as to release the coupling of the input/output part 26 of the standard interface and the communication network 20.

In FIG. 3, a step 214 discriminates whether or not the communication release instruction signal is received. When the discrimination result in the step 214 is YES, a step 218 releases the coupling of the input/output part 26 of the standard interface and the communication network 20. On the other hand, when the discrimination result in the step 214 is NO, a step 216 detects whether or not the received signal is valid by detecting whether an active or inactive carrier detection signal is received through the signal line 124. The process returns to the step 214 when the discrimination result in the step 216 is YES, but the process advances to the step 218 when the discrimination result in the step 216 is NO.

Because the transmitter part of the transmitter/receiver 18 of the communication control unit 10 is disabled, the receiver part of the transmitter/receiver 18 of the communication control unit 11 shown in FIG. 2 detects that the signal received through the signal line 128 is not in conformance with the set standard and supplies an inactive carrier detection signal to the control part 12 through the signal line 124. When the control part 12 of the communication control unit 11 detects the inactive carrier detection signal, that is, when no active carrier detection signal is detected, the control part 12 supplies a control signal to the switch part 14 through the signal line 130 so as to switch over the connection of the switch part 14. As a result, the switch part 14 switches over and connects the signal lines 118 and 120 to the signal lines 106 and 108, respectively. Hence, the switch part 14 is returned to the initial state, and the coupling of the input/output part 28 of the standard interface and the communication network 20 is released. In addition, the control part 12 supplies a control signal to the switch part 14 when the control part 12 receives the communication release instruction signal from the input part 13, so as to release the coupling of the input/output part 28 of the standard interface and the communication network 20.

In FIG. 4, a step 310 discriminates whether or not the communication release instruction signal is received. When the discrimination result in the step 310 is YES, a step 314 releases the coupling of the input/output part 28 of the standard interface and the communication network 20. On the other hand, when the discrimination result in the step 310 is NO, a step 312 detects whether or not the received signal is valid by detecting whether an active or inactive carrier detection signal is received through the signal line 124. The process returns to the step 310 when the discrimination result in the step 312 is YES, but the process advances to the step 314 when the discrimination result in the step 312 is NO.

The received signal from the communication network 20 may have a signal format shown in FIG. 13 which will be described later. When the received signal has a signal kind indicating portion for indicating whether the signal is a communication request signal or an acknowledge signal, it is possible to discriminate from the signal kind indicating portion whether the received signal is a communication request signal or an acknowledge signal in FIGS. 3 and 4. When the received signal has a destination address portion for indicating the address of the destination communication control unit, it is possible to discriminate from the destination address portion whether the received signal is intended for the communication control unit.

Figure 5:
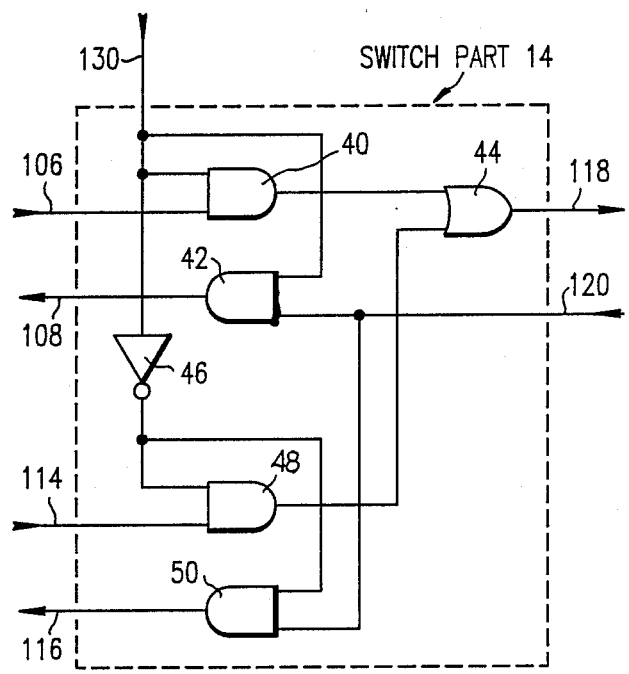
FIG. 5 is a circuit diagram showing an embodiment of a switch part of the first embodiment.

FIG. 5 shows an embodiment of the switch part 14 shown in FIG. 1. As shown in FIG. 5, the switch part 14 comprises AND circuits 40, 42, 48 and 50, an OR circuit 44, and an inverter 46.

The signal line 106 is connected to one input terminal of the AND circuit 40, and the signal line 108 is connected to an output terminal of the AND circuit 42. The signal line 114 is connected to one input terminal of the AND circuit 48, and the signal line 116 is connected to an output terminal of the AND circuit 50. The signal line 130 is connected to the other input terminal of the AND circuit 40, and is also coupled to the other input terminal of the AND circuit 48 through the inverter 46. The signal line 130 is connected to one input terminal of the AND circuit 42, and is also coupled to one input terminal of the AND circuit 50 through the inverter 46.

An output terminal of the AND circuit 40 and an output terminal of the AND circuit 48 are connected to input terminals of the OR circuit 44, and an output terminal of the OR circuit 44 is connected to the signal line 118. The signal line 120 is connected to the other input terminal of the AND circuit 42 and to the other input terminal of the AND circuit 50.

The switch part 14 shown in FIG. 5 operates as follows. When a high-level control signal is received from the control part 12 through the signal line 130, this high-level control signal is applied to the AND circuit 40 thereby passing the signal from the signal line 106 through the AND circuit 40. The signal passed through the AND circuit 40 is supplied to the OR circuit 44. In addition, the high-level control signal from the signal line 130 is inverted into a low-level signal by the inverter 46, and the low-level signal is applied to the AND circuit 48. Accordingly, the signal from the signal line 114 does not pass through the AND circuit 48, and is hence not supplied to the OR circuit 44. The OR circuit 44 is only supplied with the signal obtained from the signal line 106 through the AND circuit 40, and this signal is passed through the signal line 118 and supplied to the transmitter part of the transmitter/receiver 18.

The signal received by the receiver part of the transmitter/receiver 18 and obtained through the signal line 120 is applied to the AND circuit 42. Since the AND circuit 42 is supplied with the high-level control signal from the signal line 130, the signal from the signal line 120 passes through the AND circuit 42 and is outputted through the signal line 108. On the other hand, the signal obtained from the signal line 120 is also applied to the AND circuit 50, but the AND circuit 50 is supplied with the low-level signal from the inverter 46. Thus, the signal obtained from the signal line 120 does not pass through the AND circuit 50.

While the high-level control signal is received from the signal line 130, the signal lines 106 and 108 are connected to the signal lines 118 and 120, respectively. For this reason, the control part 12 is coupled to the transmitter/receiver 18.

On the other hand, when a low-level control signal is obtained from the signal line 130, a low-level control signal is applied to the AND circuit 40. Hence, the signal from the signal line 106 does not pass through the AND circuit 40 and is not outputted through the signal line 118. But the low-level control signal is inverted into a high-level signal by the inverter 46, and this high-level signal is applied to the AND circuit 48. Accordingly, the signal obtained from the signal line 114 passes through the AND circuit 48 and the OR circuit 44, and is outputted through the signal line 118.

Furthermore, since the low-level signal is applied to the AND circuit 42, the signal obtained from the signal line 120 does not pass through the AND circuit 42 and is not outputted through the signal line 108. However, the low-level control signal is inverted into the high-level signal in the inverter 46 and is applied to the AND circuit 50. Therefore, the signal obtained from the signal line 120 passes through the AND circuit 50 and is outputted through the signal line 116.

Accordingly, while the low-level control signal is received from the signal line 130, the signal lines 114 and 116 are connected to the signal lines 118 and 120. Thus, the input/output part 26 (or 28) of the standard interface is coupled to the transmitter/receiver 18.

According to the first embodiment, it is possible to carry out a network communication by coupling the communication network 20 to the computer 22 and the printer 24 through the input/output parts 26 and 28 of the standard interfaces. Accordingly, it is possible to use the input/output ports of the standard interface tO couple the terminals to the communication network, and no special interfaces having the concept of address are required. For example, the communication control unit of the present embodiment can be used to output data from a plurality of computers on a terminal such as a printer, and it is possible to greatly improve the utilization efficiency of the terminals.

Figure 6:
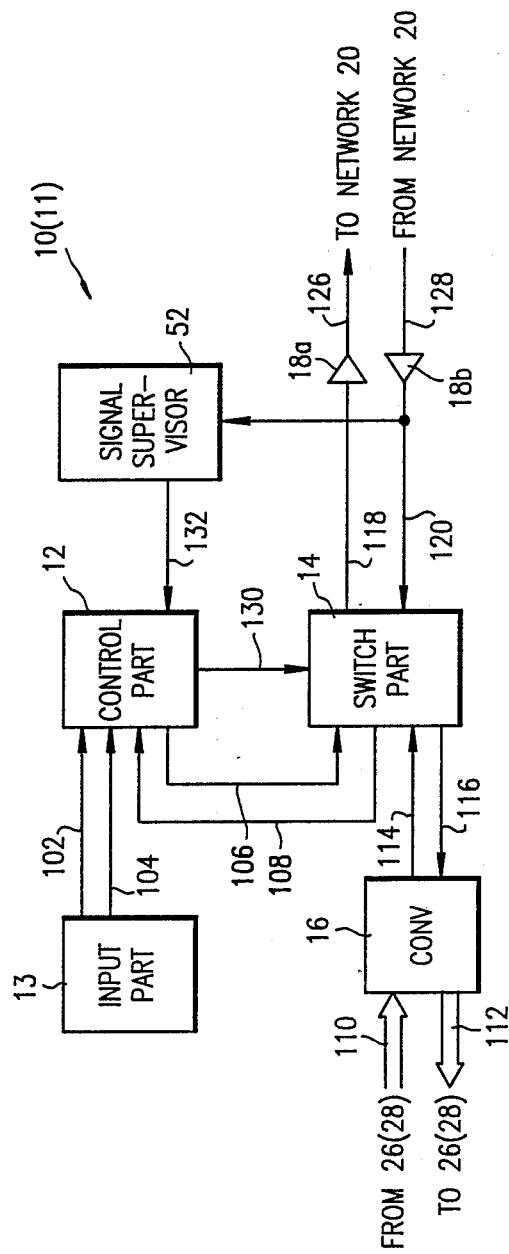
FIG. 6 is a system block diagram generally showing a second embodiment of the communication control unit according to the present invention.

Next, a description will be given on a second embodiment of the communication control unit according to the present invention. FIG. 6 generally shows the second embodiment, and in FIG. 6, those parts which are the same as these corresponding parts in FIG. 1 are designated by the same reference numerals and a description thereof will be omitted.

In the present embodiment, the communication control unit 10 (or 11) comprises a network driver 18a and a receiver 18b. The network driver 18a is coupled to the switch part 14 through the signal line 118 and to the communication network 20 through the signal line 126. The receiver 18b is coupled to the switch part 14 through the signal line 120 and to the communication network 20 through the signal line 128. The network driver 18a and the receiver 18b function as an interface between the communication network 20 and the communication control unit 10 (or 11).

The communication control unit 10 (or 11) of the present embodiment further comprises a signal supervising circuit 52. The signal supervising circuit 52 is coupled to the control part 12 through a signal line 132 and to the receiver 18b through the signal line 120. The signal supervising circuit 52 detects a signal received from the signal line 120 through the receiver 18b. The construction of the remaining parts of the communication control unit 10 (or 11) is the same as those of the first embodiment described before.

The hand-shake operation of the present embodiment is the same as that of the first embodiment, and a description thereof will be omitted for this reason. Hence, a description will be given mainly on the coupling of the terminals and the communication network and the releasing of the coupling which are peculiar to the present embodiment.

For convenience' sake, it will be assumed that the hand-shake is established, the terminals and the communication network are coupled, and a communication is carried out between the terminals through the communication network 20. In the communication control unit 10 coupled to the computer 22, the control part 12 releases the coupling of the computer 22 and the communication network 20 when a communication release instruction signal is received from the input part 13 through the signal line 104. As a result, in the communication control unit 11 coupled to the printer 24, the signal received by the signal supervising circuit 52 from the receiver 18b through the signal line 120 charges. In the present embodiment, the signal received by the signal supervising circuit 52 changes to a steady-state low level.

The signal supervising circuit 52 detects that the terminal on the other end has ended the communication, that is, the communication release instruction signal is received in the communication control unit 10 in this case, when the signal received by the signal supervising circuit 52 remains at the low level for a predetermined time. When the signal supervising circuit 52 detects that the terminal on the other end has ended the communication, the signal supervising circuit 52 supplies to the control part 12 through the signal line 132 a signal which informs the change in the signal received by the signal supervising circuit 52, that is, the receipt of the communication release instruction signal in the communication control unit 10.

When the control part 12 of the communication control unit 11 detects from the signal received from the signal supervising circuit 52 that the communication release instruction signal is received in the communication control unit 10, the control part 12 supplies a control signal to the switch part 14 through the signal line 130 as described before so as to switch over the connection of the switch part 14. As a result, the signal lines 118 and 120 are connected to the signal lines 106 and 108, respectively, and the communication control unit 11 releases the coupling of the input/output part 28 of the standard interface and the communication network 20.

According to the present embodiment, the signal supervising circuit 52 of the communication control unit 11 detects the change in the signal received by the signal supervising circuit 52 when the communication release instruction signal is received in the communication control unit 10 which is coupled to the computer 22. Therefore, the control part 12 of the communication control unit 11 supplies the control signal for switching over the connection of the switch part 14 responsive to this detection made in the signal supervising circuit 52, and the communication control unit 11 releases the coupling of the input/output part 28 of the standard interface and the communication network 20.

Therefore, when the communication is compulsorily ended in the communication control unit 10, the end of the communication is transmitted to the communication control unit 11 on the other end, so that the communication can promptly be ended in the communication control unit 11. As a result, the utilization efficiency of the communication network 20 is improved because the coupling of the input/output part 28 of the standard interface and the communication network 20 is promptly released at the end of the communication. Furthermore, since the coupling of the input/output part 28 of the standard interface and the communication network 20 is released by detecting the change in the signal received by the signal supervising circuit 52, the release of the coupling can be achieved for various signal formats.

Figure 7:
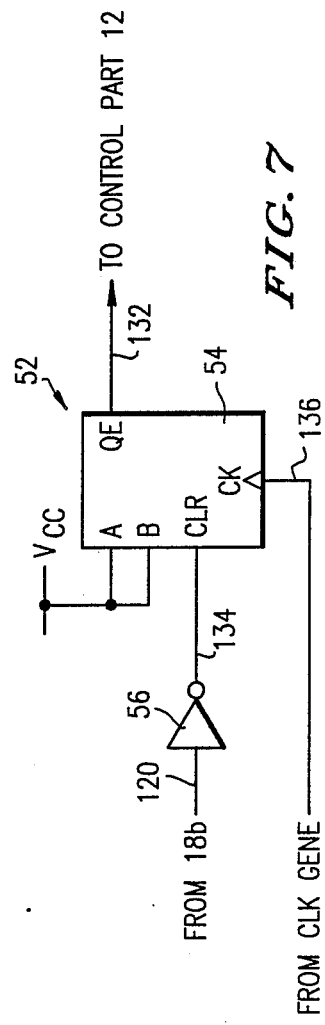
FIG. 7 is a circuit diagram showing an embodiment of a signal supervising circuit of the second embodiment.

FIG. 7 shows an embodiment of the signal supervising circuit 52. As shown, the signal supervising circuit 52 comprises a shift register 54 and an inverter 56. For example, a generally available integrated circuit such as a shift register LS164 may be used for the shift register 54. Inputs A and B of the shift register 54 are both fixedly coupled to a power source voltage Vcc (high level). A clear terminal CLR is coupled to the signal line 120 through a signal line 134 and the inverter 56 The signal line 120 is coupled to the receiver 18b shown in FIG. 6. The shift register 54 is cleared when a low-level signal is applied to the clear terminal CLR. A clock terminal CK is coupled to a clock signal generating circuit (not shown) through a signal line 136. A clock signal CLOCK having a frequency appropriately selected for the system operation is generated from the clock signal generating circuit and supplied to the clock terminal CK. An output terminal $Q_E$ of the shift register 54 is coupled to the control part 12 through the signal line 132.

Next, a description will be given on the operation of the signal supervising circuit 52 by referring to the timing charts shown in FIGS. 8(A) through 8(F).

Figure 8:
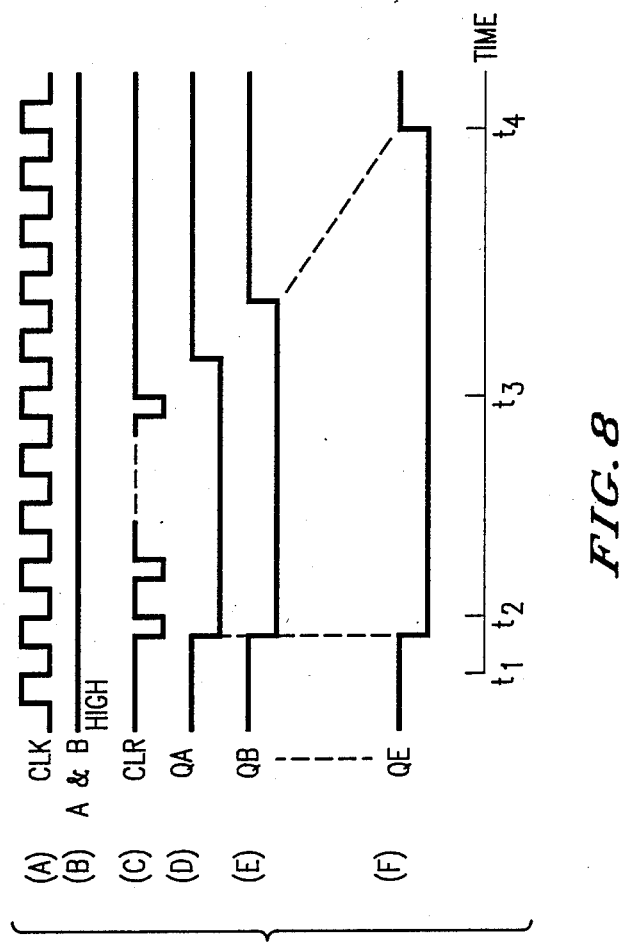
FIGS. 8(A) through 8(F) are timing charts for explaining the operation of the signal supervising circuit shown in FIG. 7.

At a waiting time $t_1$ (initial state), a steady-state low-level signal from the receiver 18b is applied to the inverter 56 through the signal line 120, and a high-level signal is thus supplied to the clear terminal CLR of the shift register 54 through the signal line 134. As a result, the signal level is high at each of the output terminals $Q_A$ through $Q_E$ of the shift register 54. For convenience' sake, FIG. 7 only shows the output terminal $Q_E$. FIG. 8(A) shows the clock signal CLOCK supplied to the clock terminal CLK of the shift register 54, FIG. 8(B) shows the fixed power source voltage Vcc (high level) applied to the inputs A and B of the shift register 54, and FIG. 8(C) shows the signal supplied to the clear terminal CLR of the shift register 54. For convenience' sake, FIGS. 8(D) through 8(F) only show the signal levels at the output terminals $Q_A$, $Q_B$ and $Q_E$ of the shift register 54.

When the signal received by the receiver 18b is supplied to the inverter 56 through the signal line 120 at a time $t_2$, a low-level signal is supplied to the clear terminal CLR of the shift register 54 from the inverter 56 through the signal line 134. Hence, the shift register 54 is cleared and the signal level becomes low at each of the output terminals $Q_A$ through $Q_E$ of the shift register 54. This state of the shift register 54 corresponds to a state where the received signal is detected in the signal supervising circuit 52.

The received signal repeats a certain transition of state, but the signal level at the output terminal $Q_E$ of the shift register 54 is unaffected thereby unless a steady-state low-level signal continues for over a predetermined number of periods of the clock signal CLOCK. Accordingly, the signal supplied to the signal line 132 from the output terminal $Q_E$ remains at the low level until a time $t_3$, for example. The signal level at the output terminal $Q_E$ changes when the received signal obtained from the receiver 18b through the signal line 120 remains at the low level for over the predetermined number periods of the clock signal CLOCK. In other words, the signal level at the output terminal $Q_E$ becomes high as shown at a time $t_4$. This change in the signal level at the output terminal $Q_E$ indicates that the received signal has ceased, and the signal from the output terminal $Q_E$ is supplied to the control part 12 through the signal line 132 as a signal indicating that the communication is ended by the terminal on the other end. Thus, the control part 12 controls the switch part 14 responsive to the signal from the output terminal $Q_E$ and releases the coupling of the terminal and the communication network.

Of course, the predetermined number of periods of the clock signal CLOCK based on which the non-existence of the received signal is detected is appropriately selected depending on the signal format of the standard interface.

Figure 9:
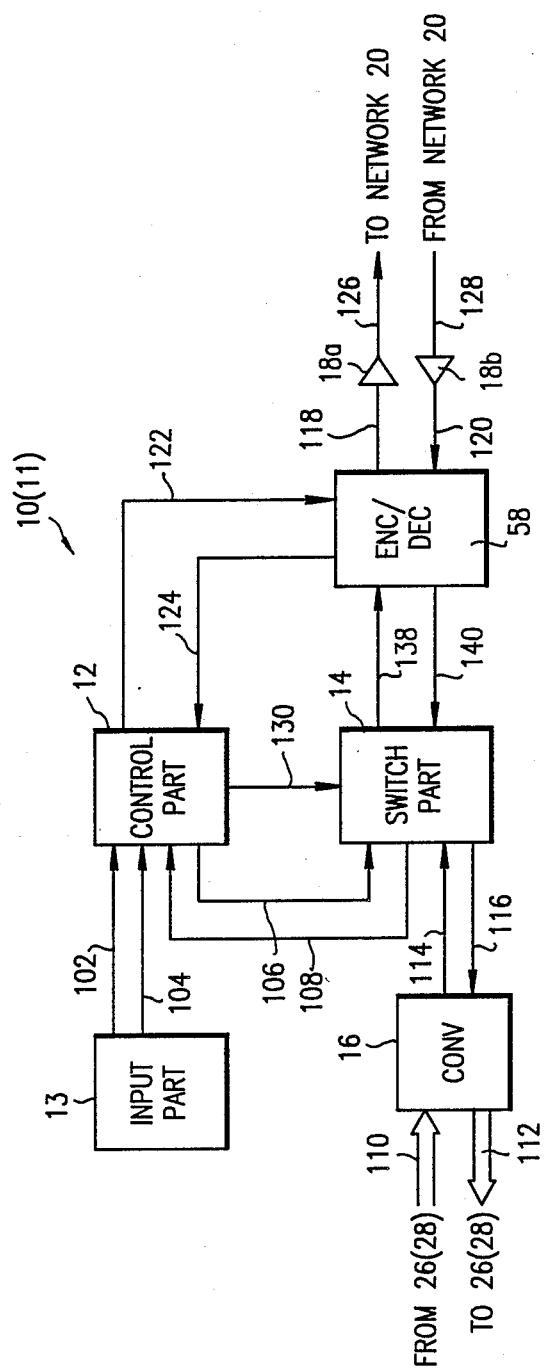
FIG. 9 is a system block diagram generally showing a third embodiment of the communication control unit according to the present invention.

Next, a description will be given on a third embodiment of the communication control unit according to the present invention. FIG. 9 generally shows the third embodiment, and in FIG. 9, those parts which are the same as those corresponding parts in FIG. 1 are designated by the same reference numerals and a description thereof will be omitted. In the present embodiment, the signal transmission and reception between the communication control unit and the communication network are carried out by use of a Manchester encoder/decoder 58 including carrier detecting means.

The encoder/decoder 58 is coupled to the control part 12 through the signal line 122, and receives an encoder enable signal from the control part 12 through the signal line 122. The encoder/decoder 58 is also coupled to the control part 12 through the signal line 124, and supplies a carrier detection signal to the control part 12 through the signal line 124. For example, an integrated circuit such as a Manchester encoder/decoder Am7960 manufactured by Advanced Micro Device Inc. may be used as the encoder/decoder 58.

The encoder/decoder 58 is also coupled to the switch part 14 through signal lines 138 and 140. The signal received from the terminal through the signal line 138 is supplied to the communication network 20, and the signal received from the communication network 20 is supplied to the terminal through the signal line 140.

When transmitting a signal from the computer 22 to the communication network 20, the control part 12 of the communication control unit 10 supplies the encoder enable signal to the encoder/decoder 58 through the signal line 122, and an encoder part of the encoder/decoder 58 is enabled. Accordingly, the encoder part of the encoder/decoder 58 encodes the signal obtained from the terminal through the signal line 138.

On the other hand, in the communication control unit 11 on the reception side, a decoder part of the encoder/decoder 58 decodes the data back into the original signal when it is detected that the signal received by the decoder part from the communication network 20 through the receiver 18b is in conformance with the set encoding standard. The decoded signal from the decoder part of the encoder/decoder 58 is supplied to the switch part 14 through the signal line 140.

When releasing the coupling of the input/output part of the standard interface and the communication network 20, the decoder part of the encoder/decoder 58 in the communication control unit 10, for example, in which the communication release instruction is given supplies a communication release instruction signal to the control part 12. The control part 12 supplies a control signal to the switch part 14 through the signal line 130 for switching over the connection of the switch part 14 responsive to the communication release instruction signal, and the coupling of the computer 22 and the communication network 20 is released. In addition, the control part 12 supplies an encoder disable signal to the encoder/decoder 58 through the signal line 122 to stop the encoding of the encoder part of the encoder/decoder 58.

Accordingly, at the communication control unit 11 on the other end, the encoder/decoder 58 no longer detects the encoded data and this information is supplied to the control part 12 through the signal line 124. Hence, a control signal is supplied to the switch part 14 from the control part 12 to switch over the connection of the switch part 14, and the coupling of the printer 24 and the communication network 20 is released. In addition, the control part 12 supplies an encoder disable signal to the encoder/decoder 58 to stop the encoding of the encoder part of the encoder/decoder 58. Therefore, the coupling of the computer 22 and the printer 24 through the communication path 20 is completely released.

According to the present embodiment, the encoder/decoder 58 of the communication control unit 11 no longer detects the encoded data when the communication release instruction signal is received in the communication control unit 10 which is coupled to the computer 22. Hence, the control part 12 supplies a control signal to the switch part 14 to switch over the connection thereof, and the communication control unit 11 releases the coupling of the input/output part 28 of the standard interface and the communication network 20.

Therefore, when the communication is compulsorily ended at the communication control unit 10, the end of the communication is promptly transmitted to the communication control unit 11 on the other end so that the communication can promptly be ended at the communication control unit 11. The utilization efficiency of the communication network 20 is greatly improved by releasing the coupling at the end of the communication.

In the second and third embodiments, it is possible to use the switch part 14 having the construction shown in FIG. 5.

Figure 10:
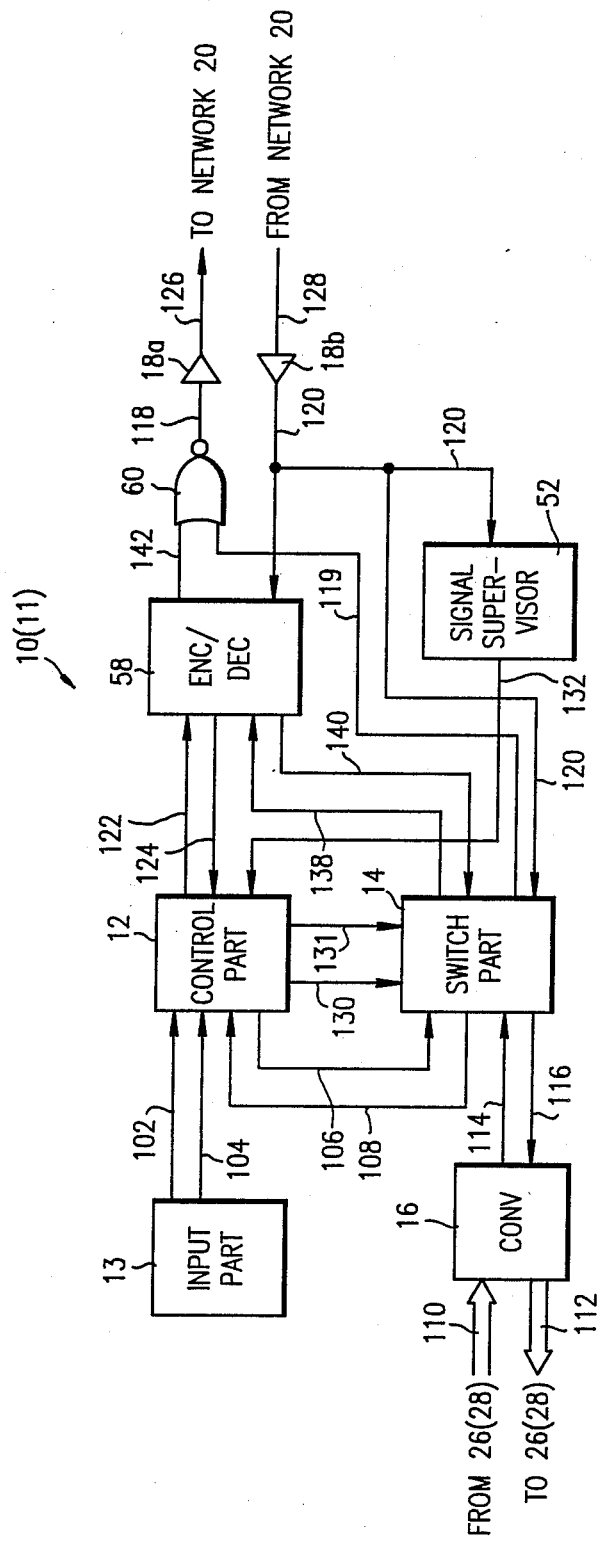
FIG. 10 is a system block diagram generally showing a fourth embodiment of the communication control unit according to the present invention.

Next, a description will be given on a fourth embodiment of the communication control unit according to the present invention. FIG. 10 generally shows the fourth embodiment, and in FIG. 10, those parts which are the same as those corresponding parts in FIGS. 6 and 9 are designated by the same reference numerals and a description thereof will be omitted. The fourth embodiment has the functions of both the second and third embodiments described before.

In the present embodiment, the communication control unit 10 (or 11) comprises the signal supervising circuit 52 as in the case of the second embodiment shown in FIG. 6. The signal supervising circuit 52 is coupled to the control part 12 through the signal line 132 and to the receiver 18b through the signal line 120. In addition, the communication control unit 10 (or 11) comprises the Manchester encoder/decoder 58 as in the case of the third embodiment shown in FIG. 9. The encoder/decoder 58 is coupled to the control part 12 through the signal lines 122 and 124, and to the switch part 14 through the signal lines 138 and 140.

The encoder/decoder 58 is also coupled to one input terminal of an OR circuit 60 through a signal line 142. The switch part 14 is coupled to the receiver 18b through the signal line 120 and to the other input terminal of the OR circuit 60 through a signal line 119.

The present embodiment is suited for the case where the data rate of the signal used for the hand-shake greatly differs from the data rate of the standard interface signal which is subjected to the serial conversion. In other words, the present embodiment is used when the signal having a low data rate requires the encoding process because the signal level transition time is too long compared to the maximum signal level transition time permitted in the communication network, and the signal having a high data rate does not require the encoding process.

According to the present embodiment, one of the two transmission paths is selected and coupled to the terminal and the communication network. That is, the switch part 14 is coupled to the network driver 18a and the receiver 18b through the signal lines 138, 142 and 118 and the signal lines 120 and 140, or through the signal lines 119 and 118 and the signal line 120.

In the case where the switch part 14 is coupled to the network driver 18a and the receiver 18b through the signal lines 138, 142 and 118 and the signal lines 120 and 140, the coupling is released as described before in conjunction with FIG. 9. On the other hand, the coupling is released as described before in conjunction with FIG. 6 when the switch part 14 is coupled to the network driver 18a and the receiver 18b through the signal lines 119 and 118 and the signal line 120.

According to the present embodiment, the signal supervising circuit 52 of the communication control unit 11 detects the change in the signal received by the signal supervising circuit 52 when the communication release instruction signal is received in the communication control unit 10 which is coupled to the computer 22. Therefore, the control part 12 of the communication control unit 11 supplies the control signal for switching over the connection of the switch part 14 responsive to this detection made in the signal supervising circuit 52, and the communication control unit 11 releases the coupling of the input/output part 28 of the standard interface and the communication network 20.

Therefore, when the communication is compulsorily ended in the communication control unit 10, the end of the communication is transmitted to the communication control unit 11 on the other end, so that the communication can promptly be ended in the communication control unit 11. As a result, the utilization efficiency of the communication network 20 is improved because the coupling of the input/output part 28 of the standard interface and the communication network 20 is promptly released at the end of the communication.

Figure 11:
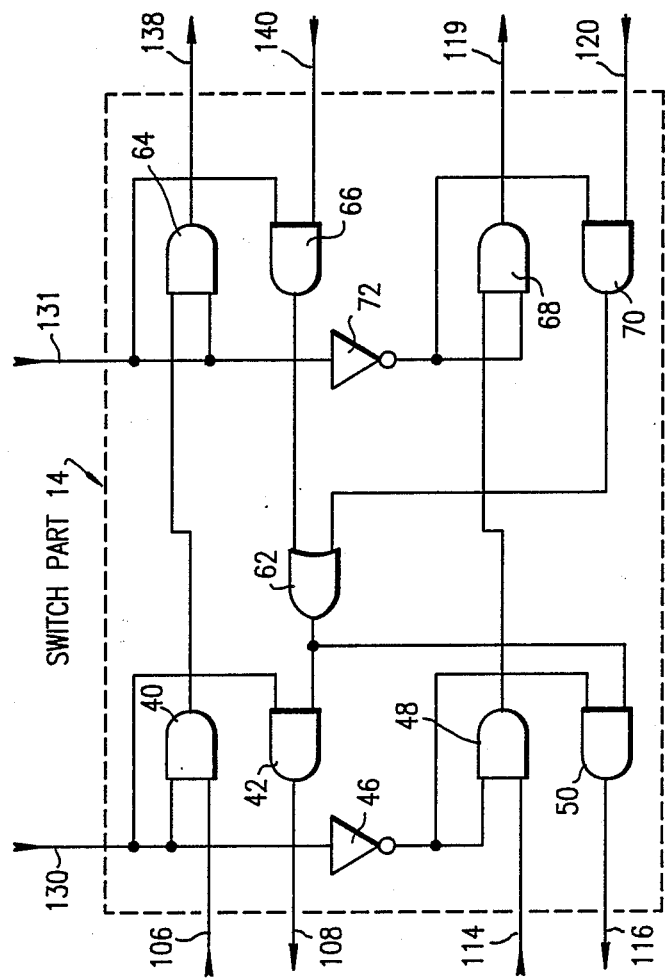
FIG. 11 is a circuit diagram showing an embodiment of a switch part of the fourth embodiment.

FIG. 11 shows an embodiment of the switch part 14 of the fourth embodiment. In FIG. 11, those parts which are the same as those corresponding parts in FIG. 5 are designated by the same reference numerals, and a description thereof will be omitted. In FIG. 11, the switch part 14 comprises an OR circuit 62, AND circuits 64, 66, 68 and 70 and an inverter 72 in addition to the AND circuits 40, 42, 48 and 50 and the inverter 46 shown in FIG. 5. The output terminal of the AND circuit 40 is connected to one input terminal of the AND circuit 64, and the output terminal of the AND circuit 48 is connected to one input terminal of the AND circuit 68.

A signal line 131 is connected to the other input terminal of the AND circuit 64, and is also coupled to the other input terminal of the AND circuit 68 through the inverter 72. The signal line 131 is also connected to one input terminal of the AND circuit 66, and is coupled to one input terminal of the AND circuit 70 through the inverter 72.

The signal line 138 is connected to the output terminal of the AND circuit 64, and the signal line 119 is connected to an output terminal of the AND circuit 68. The signal line 140 is connected to the other input terminal of the AND circuit 66, and the signal line 120 is connected to the other input terminal of the AND circuit 70.

Furthermore, output terminals of the AND circuits 66 and 70 are connected to input terminals of the OR circuit 62, and an output terminal of the OR circuit 62 is connected to the other input terminals of the AND circuits 42 and 50.

Next, a description will be given on the operation of the switch part 14 shown in FIG. 11. When a high-level signal is received through the signal line 130, one of the input signals to the AND circuit 40 and one of the input signals to the AND circuit 42 become high. Hence, the signal from the signal line 106 passes through the AND circuit 40, and a signal is supplied to the signal line 108 from the AND circuit 42. On the other hand, a low-level signal is supplied to one of the input terminals of the AND circuit 48 and to one of the input terminals of the AND circuit 50 because the high-level signal from the signal line 130 is inverted in the inverter 46. Thus, the signal from the signal line 114 does not pass through the AND circuit 48, and no signal is supplied to the signal line 116 from the AND circuit 50.

Therefore, the signal lines 106 and 108 are selected and coupled to the communication network 20 responsive to the high-level signal from the signal line 130. On the other hand, the signal lines 114 and 116 are selected and coupled to the communication network 20 responsive to a low-level signal from the signal line 130.

When a high-level signal is received from the signal line 131, one of the input signals of the AND circuit 64 and one of the input signals of the AND circuit 66 become high. Hence, a signal is supplied to the signal line 138 from the AND circuit 64, and the signal from the signal line 140 passes through the AND circuit 66. On the other hand, a low-level signal from the inverter 72 is supplied to one of the input terminals of the AND circuit 68 and to one of the input terminals of the AND circuit 70. As a result, no signal is supplied to the signal line 119 from the AND circuit 68, and the signal from the signal line 120 does not pass through the AND circuit 70.

Accordingly, the signal lines 138 and 140 are selected and coupled to the communication network 20 responsive to the high-level signal from the signal line 131. On the other hand, the signal lines 119 and 120 are selected and coupled to the communication network 20 responsive to a low-level signal from the signal line 131.

Figure 12:
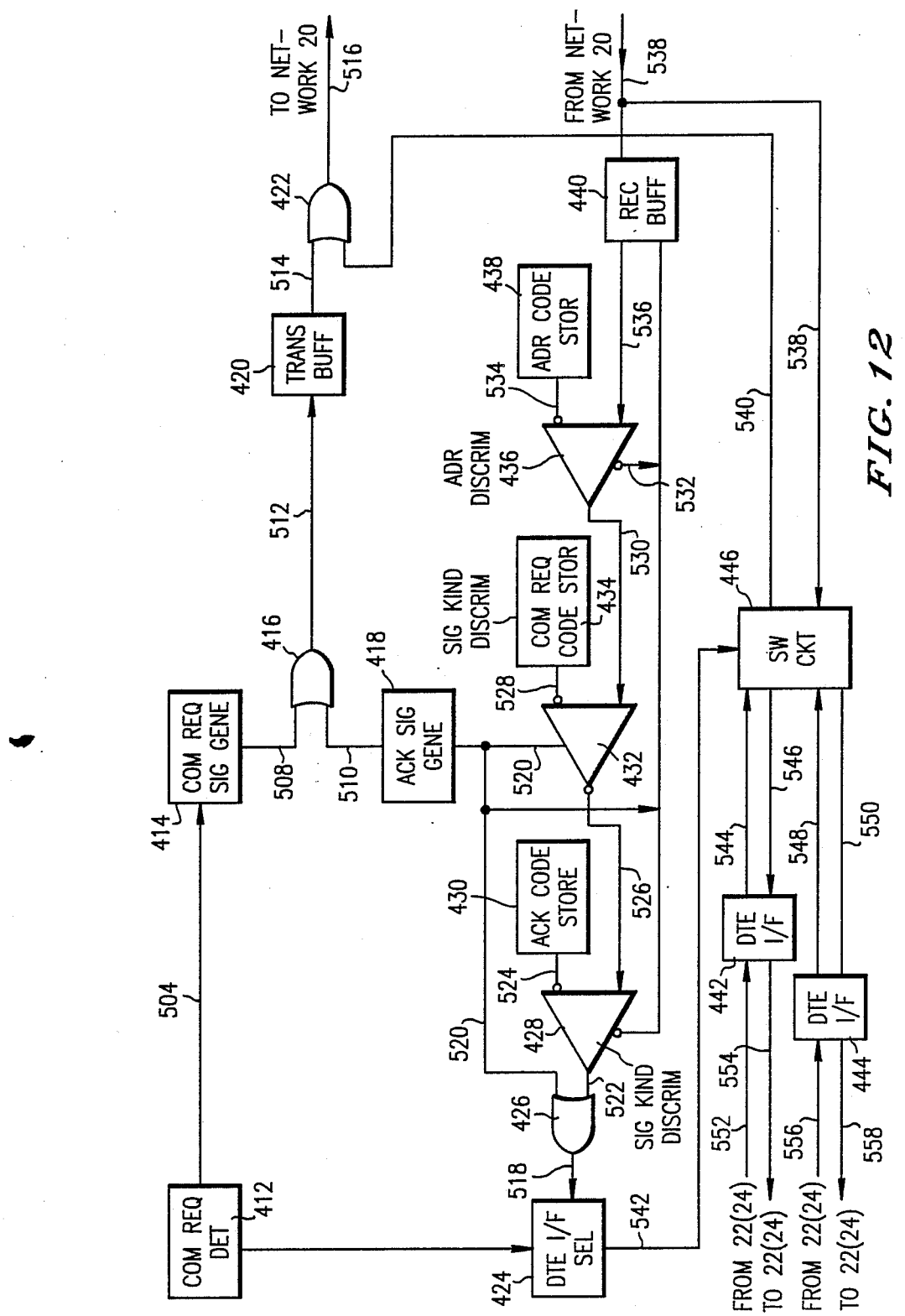
FIG. 12 is a system block diagram generally showing a fifth embodiment of the communication control unit according to the present invention.

Next, a description will be given on a fifth embodiment of the communication control unit according to the present invention. FIG. 12 generally shows the fifth embodiment.

In the present embodiment, the communication control unit 10A (or 11A) comprises a communication request detecting circuit 412. The communication request detecting circuit 412 corresponds to the input part 13 of the previously described embodiments, and a communication request instruction signal may be entered by the operator from an input device such as a keyboard. The communication request detecting circuit 412 detects the entered communication request instruction signal, and supplies a control signal for operating a communication request signal generating circuit 414 to the communication request signal generating circuit 414 through a signal line 504. In addition, when the communication request detecting circuit 412 detects the communication request instruction signal, the communication request detecting circuit 412 supplies an instruction signal to a data terminal equipment (DTE) interface selecting circuit 424 through a signal line 506. As will be described later, the instruction signal instructs which one of DTE interfaces 442 and 444 is to be coupled to the communication network 20.

The communication request signal generating circuit 414 is started responsive to the control signal from the communication request detecting circuit 412, and generates a communication request signal which is supplied to one input terminal of an OR circuit 416 through a signal line 508. When the communication control unit 10A is used on the transmitter side, an acknowledge signal is generated from an acknowledge signal generating circuit 418 which will be described later, and this acknowledge signal is supplied to the other input terminal of the OR circuit 416 through a signal line 510. Hence, when the communication request signal generating circuit 414 does not generate the communication request signal, a signal having a logic level "0" is supplied to the OR circuit 416 so that the acknowledge signal supplied to the OR circuit 416 from the acknowledge signal generating circuit 418 will not be masked.

When the communication request signal from the communication request signal generating circuit 414 or the acknowledge signal from the acknowledge signal generating circuit 418 is received by the OR circuit 416, the received signal is supplied to a transmitter buffer 420 through a signal line 512. The transmitter buffer 420 supplies the signal received from the OR circuit 416 to an OR circuit 422 through a signal line 514. The OR circuit 422 supplies the signal from the transmitter buffer 420 or a switching circuit 446 which will be described later to the communication network 20 through a signal line 516.

A receiver buffer 440 receives a signal from the communication network 20 through a signal line 538, and supplies the received signal to an address discriminating circuit 436 through a signal line 536. The signal received by the receiver buffer 440 from the communication network 20 is the communication request signal or the acknowledge signal. As shown in FIG. 13, the communication request signal and the acknowledge signal are both made up of a destination address portion, an originating address portion and a signal kind indicating portion. The destination address portion comprises an address code of the communication control unit 11A, for example, which is located on the receiver side. The originating address portion comprises an address code of the communication control unit 10A which is located on the transmitter side. In addition, the signal kind indicating portion comprises a code indicative of the kind of signal, that is, whether the signal is the communication request signal or the acknowledge signal.

The address discriminating circuit 436 is also supplied with an output signal of an address code storage circuit 438 through a signal line 534. The address code storage circuit 438 pre-stores an address code sufficient to discriminate a specific one of the communication control units coupled to the communication network 20. In this case, the specific one of the communication control units is the communication control unit 11A located on the receiver side.

The address discriminating circuit 436 compares the destination address portion of the signal received from the receiver buffer 440 and the address code of the communication control unit 11A received from the address code storage circuit 438, so as to discriminate whether or not the communication request signal (or the acknowledge signal) received from the receiver buffer 440 is intended for the communication control unit 11A. In the case where the signal received from the receiver buffer 440 is intended for the communication control unit 11A, the address discriminating circuit 436 supplies the communication request signal (or the acknowledge signal) from the receiver buffer 440 to a signal kind discriminating circuit 432 through a signal line 530. On the other hand, in the case where the signal received from the receiver buffer 440 is not intended for the communication control unit 11A, the address discriminating circuit 436 supplies a reset signal to the receiver buffer 440 through a signal line 532.

The signal kind discriminating circuit 432 is also supplied with an output signal of a communication request code storage circuit 434 through a signal line 528. A communication request code which is standardized among all of the communication control units coupled to the communication network 20 is pre-stored in the communication request code storage circuit 434.

The signal kind discriminating circuit 432 compares the signal kind indicating portion of the signal received from the address discriminating circuit 436 and data of the communication request code outputted from the communication request code storage circuit 434, so as to discriminate whether or not the signal from the address discriminating circuit 436 is the communication request signal. When the signal kind indicating portion of the signal received from the address discriminating circuit 436 coincides with the data of the communication request code outputted from the communication request code storage circuit 434, the signal kind discriminating circuit 432 discriminates that the signal received from the address discriminating circuit 436 is the communication request signal. Hence, in this case, the signal kind discriminating circuit 432 outputs a signal indicating that the communication request signal is received, and this signal is supplied to the acknowledge signal generating circuit 418 and the OR circuit 426 through a signal line 520.

When the acknowledge signal generating circuit 418 receives the signal from the signal kind discriminating circuit 432 indicating that the communication request signal is received, the acknowledge signal generating circuit 418 is started responsive to this signal and supplies the generated acknowledge signal to the OR circuit 416 through the signal line 510.

On the other hand, when the signal kind discriminating circuit 432 discriminates that the signal received from the address discriminating circuit 436 is not the communication request signal, the signal kind discriminating circuit 432 supplies the signal received from the address discriminating circuit 436 to a signal kind discriminating circuit 428 through a signal line 526. The signal kind discriminating circuit 428 is also supplied with an output signal of an acknowledge code storage circuit 430. The acknowledge code storage circuit 430 pre-stores an acknowledge code which is standardized among all of the communication control units coupled to the communication network 20.

The signal kind discriminating circuit 428 compares the signal kind indicating portion of the signal received from the signal kind discriminating circuit 432 and data of the acknowledge code outputted from the acknowledge code storage circuit 430, so as to discriminate whether or not the signal received from the signal kind discriminating circuit 432 is the acknowledge signal. When the signal kind indicating portion of the signal received from the signal kind discriminating circuit 432 coincides with the data of the acknowledge code outputted from the acknowledge code storage circuit 430, the signal kind discriminating circuit 428 discriminates that the signal received from the signal kind discriminating circuit 432 is the acknowledge signal. Hence, in this case, the signal kind discriminating circuit 428 outputs a signal indicating that the acknowledge signal is received, and this signal is supplied to the OR circuit 426 through a signal line 522.

When the signal from the signal kind discriminating circuit 432 indicating that the communication request signal is received or the signal from the signal kind discriminating circuit 428 indicating that the acknowledge signal is received is received by the OR circuit 426, the OR circuit 426 supplies a start signal to the DTE interface selecting circuit 424 through a signal line 518.

The DTE interface selecting circuit 424 is started by the start signal from the OR circuit 426, and outputs a control signal based on the signal from the communication request detecting circuit 412 for selecting the desired DTE interface. The output control signal of DTE interface selecting circuit 424 is used for switching over the connection of the switching circuit 446, and the control signal is supplied to the switching circuit 446 through a signal line 542. The connection of the switching circuit 446 is switched over responsive to the control signal from the DTE interface selecting circuit 424, and couples one of the DTE interfaces 442 and 444 to the communication network 20 and disconnects and releases the other of the DTE interfaces 442 and 444 from the communication network 20.

The signal supplied to the switching circuit 446 from the DTE interface 442 or 444 selected by the switching circuit 446 is supplied to the communication network 20 through a signal line 540, the OR circuit 422 and a signal line 516. In addition, the signal received by the switching circuit 446 from the communication network 20 through a signal line 538 is supplied to the DTE interface 442 or 444 selected by the switching circuit 446.

When the DTE interface 442 is selected by the switching circuit 446, the DTE interface 442 is coupled to the switching circuit 446 through signal lines 544 and 546. The DTE interface 442 is also coupled to a data terminal equipment (not shown) through signal lines 552 and 554.

Similarly, when the DTE interface 444 is selected by the switching circuit 46, the DTE interface 444 is coupled to the switching circuit 446 through signal lines 548 and 550. The DTE interface 444 is also coupled to a data terminal equipment (not shown) through signal lines 556 and 558.

For example, a serial interface RS232C, a serial interface RS422, a Centronics spiral interface and the like may be used for the DTE interfaces 442 and 444. Two or more kinds of such interfaces may be selectively used as the DTE interfaces. In the present embodiment, only two DTE interfaces 442 and 444 are provided, but the number of DTE interfaces coupled to the switching circuit 446 is not limited to two, and it is possible to couple three or more DTE interfaces to the switching circuit 446.

FIG. 14 shows a communication system applied with the fifth embodiment of the communication control unit according to the present invention. As shown in FIG. 13, the communication control unit 10A is coupled to a data terminal equipment 22A and the communication network 20. The communication control unit 11A having a construction identical to that of the communication control unit 10A is coupled to a data terminal equipment 24A and the communication network 20.

Next a description will be given on the operation of the communication control unit 10A by referring to FIG. 14. It will be assumed for convenience' sake that a communication is made from the data terminal equipment 22A to the data terminal equipment 24A through the communication network 20.

First, the communication request instruction signal is entered into the communication control unit 10A on the transmitter side. When the communication request detecting circuit 412 of the communication control unit 10A receives the communication request instruction signal, the communication request detecting circuit 412 outputs a signal for selecting the one of the DTE interfaces 442 and 444 to be coupled to the communication network 20. This signal from the communication request detecting circuit 412 is supplied to the DTE interface selecting circuit 424 through the signal line 506. A control signal for starting the communication request signal generating circuit 414 is also outputted from the communication request detecting circuit 412 and is supplied to the communication request signal generating circuit 414 through the signal line 504.

The communication request signal generating circuit 414 is started responsive to the control signal from the communication request detecting circuit 412, and the communication request signal from the communication request signal generating circuit 414 is supplied to one input terminal of the OR circuit 416 through the signal line 508. In this case, the communication control unit 10A is provided on the transmitter side. Hence, no acknowledge signal is generated from the acknowledge signal generating circuit 418, and a signal having the logic level "0" is supplied to the other input terminal of the OR circuit 416 from the acknowledge signal generating circuit 418. Accordingly, the communication request signal from the communication request signal generating circuit 414 is outputted from the OR circuit 416 and is supplied to the transmitter buffer 420 through the signal line 512.

The communication request signal from the transmitter buffer 420 is supplied to one input terminal of the OR circuit 422 through the signal line 514. In this state, the signal from the switching circuit 446 is not supplied to the other input terminal of the OR circuit 422. Thus, the OR circuit 422 outputs the communication request signal, and this communication request signal is supplied to the communication network 20 through the signal line 526.

On the other hand, at the communication control unit 11A on the receiver side, the communication request signal from the communication control unit 10A is received from the communication network 20 by the receiver buffer 440 through the signal line 538. The communication request signal received by the receiver buffer 440 is supplied to the address discriminating circuit 436 through the signal line 536. The address discriminating circuit 436 compares the destination address portion of the received communication request signal and the address code of the communication control unit 11A read out from the address code storage circuit 438. Since the communication request signal is intended for the communication control unit 11A in this case, the destination address portion coincides with the address code read out from the address code storage circuit 438.

Accordingly, the communication request signal received from the communication network 20 is outputted from the address discriminating circuit 436 and is supplied to the signal kind discriminating circuit 432 through the signal line 530. The signal kind discriminating circuit 432 compares the signal kind indicating portion of the communication request signal and the communication request code read out from the communication request code storage circuit 434. In this case, the communication request signal coincides with the communication request code read out from the communication request code storage circuit 434 because the received signal from the communication network 20 is the communication request signal. Hence, a start signal is outputted from the signal kind discriminating circuit 432 and is supplied to the acknowledge signal generating circuit 418 through the signal line 520.

Therefore, the acknowledge signal is outputted from the acknowledge signal generating circuit 418 and is supplied to the OR circuit 416 through the signal line 510. In this state, the communication request detecting circuit 412 of the communication control unit 11A does not detect the communication request instruction signal. For this reason, the communication request signal generating circuit 414 supplies a signal having a logic level "0" to the OR circuit 416. Thus, the acknowledge signal outputted from the acknowledge signal generating circuit 418 is supplied to the OR circuit 416 and is supplied to the communication network 20 through the transmitter buffer 420 and the OR circuit 422.

The signal kind discriminating circuit 432 also outputs a start signal which is supplied to the OR circuit 426 through the signal line 520.

As described before, the start signal from the signal kind discriminating circuit 432 is obtained from the output of the OR circuit 426, and this start signal is supplied to the DTE interface selecting circuit 424 through the signal line 518. The DTE interface selecting circuit 424 is started responsive to the start signal, and supplies to the switching circuit 446 an instruction signal for coupling the DTE interface selected by the signal from the communication request detecting circuit 412 to the communication network 20. In this case, the communication request detecting circuit 412 does not detect the communication request instruction signal. Accordingly, no signal is supplied to the DTE interface selecting circuit 424 from the communication request detecting circuit 412. This means that the DTE interface selected by the communication request detecting circuit 412 is the DTE interface pre-selected when no signal is supplied to the DTE interface.

Therefore, the switching circuit 446 couples the selected one of the DTE interfaces 442 and 444 to the communication network 20. For example, when the DTE interface 442 is selected, the DTE interface 442 is coupled to the communication network 20 by connecting the signal lines 544 and 546 to the signal lines 540 and 538, respectively.

At the communication control unit 11A, the DTE interface 442 or 444 is selected in this manner and coupled to the communication network 20. The acknowledge signal outputted from the transmitter buffer 420 of the communication control unit 11A on the receiver side is supplied to the receiver buffer 440 of the communication control unit 10A on the transmitter side.

At the communication control unit 10A, the acknowledge signal received by the receiver buffer 440 is supplied to the address discriminating circuit 436 through the signal line 536. The address discriminating circuit 436 compares the destination address portion of the received acknowledge signal and the address code read out from the address code storage circuit 438 of the communication control unit 10A. In this case, the received acknowledge signal is intended for the communication control unit 10A. Thus, the destination address portion coincides with the address code read out from the address code storage circuit 438.

Hence, the acknowledge signal received from the communication network 20 is outputted from the address discriminating circuit 436 and is supplied to the signal kind discriminating circuit 432 through the signal line 530. The signal kind discriminating circuit 432 compares the signal kind indicating portion of the received acknowledge signal and the communication request code read out from the communication request code storage circuit 434. In this case, the received signal is the acknowledge signal, and the signal kind indication portion of the received acknowledge signal does not coincide with the communication request code read out from the communication request code storage circuit 434. Accordingly, the signal kind discriminating circuit 432 outputs no start signal, and no start signal is supplied to the acknowledge signal generating circuit 418 nor the OR circuit 426 through the signal line 520.

In addition, the acknowledge signal from the signal kind discriminating circuit 432 is supplied to the signal kind discriminating circuit 428. The acknowledge signal supplied to the signal kind discriminating circuit 428 is compared with the acknowledge code read out from the acknowledge code storage circuit 430. In this case, the received acknowledge signal coincides with the acknowledge code read out from the acknowledge code storage circuit 430. Thus, a start signal is supplied to the OR circuit 426 from the signal kind discriminating circuit 428.

The OR circuit 426 outputs the start signal from the signal kind discriminating circuit 428, and this start signal is supplied to the DTE interface selecting circuit 424 through the signal line 518. The DTE interface selecting circuit 424 is started responsive to the start signal, and supplies to the switching circuit 446 an instruction signal for coupling the DTE interface selected by the signal from the communication request detecting circuit 412 to the communication network 20. In this case, the communication request detecting circuit 412 detects the communication request instruction signal. Accordingly, a signal is supplied to the DTE interface selecting circuit 424 from the communication request detecting circuit 412. This means that the DTE interface selected by the communication request detecting circuit 412 is the DTE interface pre-selected when a signal is supplied to the DTE interface.

By completing the above described operations, the data terminal equipment 22A on the transmitter side is coupled to the communication network 20 through the communication control unit 10A, and the data terminal equipment 24A on the receiver side is coupled to the communication network 20 through the communication control unit 11A. A communication can hence be made between the data terminal equipments 22A and 24A through the communication network 20.

At a communication control unit other than the communication control unit 10A on the transmitter side and the communication control unit 11A on the receiver side, the communication request signal or the acknowledge signal from the communication control unit on the transmitter or receiver side is received from the communication network 20 by the receiver buffer 440 and is supplied to the address discriminating circuit 436. The address discriminating circuit 436 compares the destination address portion of the received signal and the address code read out from the address code storage circuit 438, and discriminates that the received signal is not intended for the communication control unit because the two compared addresses do not coincide. Hence, the address discriminating circuit 436 supplies a reset signal to the receiver buffer 440 through the signal line 532 and cancels or discards the received signal which is not intended therefor. In this case, the received signal from the communication network 20 is not supplied to the signal kind discriminating circuit 432 from the address discriminating circuit 436.

Therefore, the communication control unit other than the communication control unit 10A on the transmitter side and the communication control unit 11A on the receiver side carries out the above described operation to cancel or discard the received communication request signal or the received acknowledge signal which is not intended therefor.

According to the present embodiment, one of the DTE interfaces 442 and 444 is selected by the DTE interface selecting circuit 424 depending on the existence of the signal supplied to the DTE interface selecting circuit 424 from the communication request detecting circuit 412. In addition, the DTE interface selecting circuit 424 is started by discriminating the communication request signal or the acknowledge signal intended therefor, so as to switch over the connection of the switching circuit 446 and couple the selected one of the DTE interfaces 442 and 444 to the communication network 20.

Therefore, it is possible to select and couple the DTE interface 442 or 444 to the communication network 20 depending on the existence or kind of the communication request signal. For this reason, there is no need to provide a communication control unit for controlling the coupling to the communication network 20 for each of the DTE interfaces 442 and 444. In other words, the coupling of a plurality of DTE interfaces to the communication network 20 can be controlled by a single communication control unit, and it is possible to reduce the space required to set up the communication control unit and also reduce the capacity of the required power source. Furthermore, there is no need to design the communication control unit independently for each kind of DTE interface.

By using the communication control unit of the present embodiment, it is possible to use as they are input/output ports of a generally available personal computer and the like as the DTE interfaces for coupling to the communication network.

Moreover, it is possible to select and couple to the communication network one of a data terminal equipment for making a high speed communication over a long distance and a data terminal equipment for making a low speed communication over a short distance.

In addition, it is possible to couple a host computer for making a high speed communication over a long distance to a data terminal equipment for entering data from a printer, a scanner and the like, through the communication network.

Therefore, according to the present embodiment, the application of the communication network is enlarged because it is possible to select and couple a desired one of a plurality of DTE interfaces to the communication network.

Further, the present invention is not limited to these embodiments, but various variations and modifications may be made without departing from the scope of the present invention.

What is claimed is:

1. A communication control unit for controlling data transmission and reception between a terminal and a communication network employing a multi-conjunction architecture, said communication control unit comprising:

transmitter/receiver means for transmitting a signal to and for receiving a signal from the communication network, said signal transmitted to and received from the communication network prior to a data communication between the terminal and the communication network comprising at least a destination address portion indicating an address of a destination communication control unit, an originating address portion indicating an address of an originating communication control unit and a signal kind indicating portion indicating whether the signal is a transmission request or an acknowledge signal;

switch means for enabling signal transmission and reception between the terminal and the communication network through said transmitter/receiver means in a first state and for disabling the signal transmission and reception between the terminal and the communication network through said transmitter/receiver means in a second state; and control means comprising address discriminating means for discriminating whether or not an address indicated by the destination address portion of the signal received from the communication network through said transmitter/receiver means coincides with an address of said communication control unit, signal kind discriminating means for discriminating the kind of the signal received from the communication network through said transmitter/receiver means, and signal detecting means for detecting whether or not a signal received from the communication network through said transmitter/receiver means is intended for the terminal coupled to said communication control unit based on a discrimination made in said address discriminating means, said control means controlling said switch means to the first state only when said address discriminating means discriminates that the two addresses coincide and said signal kind discriminating means discriminates that the signal received is a transmission request signal when receiving the signal from the communication network through said transmitter/receiver means, and controlling said switch means to the first state only when said address discriminating means discriminates that the two addresses coincide and said signal kind discriminating means discriminates that the signal received is an acknowledge signal when transmitting the signal to the communication network through said transmitter/receiver means.

2. A communication control unit as claimed in claim 1 which further comprises signal supervising means for monitoring the signal received from the communication network through said transmitter/receiver means and outputting a monitoring signal, said control means receiving said monitoring signal and controlling said switch means to the second state so as to disconnect the terminal from the communication network depending on said monitoring signal from said signal supervising means when signal transmission and reception is made between the terminal and communication network.

3. The communication control unit as claimed in claim 2 in which said control means controls said switch means to the second state when said signal supervising means provides said monitoring signal at a predetermined logic level which continues for over a predetermined time.

4. A communication control unit as claimed in claim 1 in which said transmitter/receiver means comprises a transmitter for transmitting a signal to the communication network and a receiver for receiving a signal from the communication network.

5. A communication control unit as claimed in claim 1 which further comprises converting means for subjecting a signal supplied to and a signal received from the terminal to a signal conversion.

6. A communication control unit as claimed in claim 5 in which the signal conversion carried out by said converting means includes a signal level, conversion.

7. A communication control unit as claimed in claim 5 in which the signal conversion carried out by said converting means includes a serial-to-parallel conversion for converting an output serial signal of said communication control unit into input parallel signals of the terminal and a parallel-to-serial conversion for converting output parallel signals of the terminal into an input serial signal of said communication control unit.

8. A communication control unit as claimed in claim 1 which further comprises encoder/decoder means for encoding a signal transmitted to the communication network through said transmitter/receiver means and for decoding a signal received from the communication network through said transmitter/receiver means.

9. A communication control unit as claimed in claim 8 in which said encoder/decoder means comprises carrier detecting means.

10. A communication control unit as claimed in claim 1 further comprises signal supervising means monitoring the signal received from the communication network through said transmitter/receiver means and outputting a monitoring signal, said control means receiving said monitoring signal and controlling said switch means to the second state so as to disconnect the terminal from the communication network depending on said monitoring signal from said signal supervising means when signal transmission and reception is made between the terminal and the communication network, and encoder/decoder means for encoding a signal transmitted to the communication network through said transmitter/receiver means and for decoding a signal received from the communication network through said transmitter/receiver means.

11. A communication control unit as claimed in claim 10 in which said control means controls said switch means to the second state when said signal supervising means provide said monitoring signal at a predetermined logic level which continues for over a predetermined time.

12. A communication control unit as claimed in claim 10 in which said encoder/decoder means comprises carrier detecting means.

13. A communication control unit as claimed in claim 1 in which the terminal is selected from a group at least comprising a computer and a printer.

14. A communication control for controlling data transmission and reception between a plurality of terminals and a communication network employing a multiconjunction architecture via an interface, said communication control unit comprising:

transmitter/receiver means for transmitting a signal to and for receiving a signal from the communication network, said signal transmitted to and received from the communication network prior to a data communication between the terminal and the communication network comprising at least a destination address portion indicating an address of a destination communication control unit, an originating address portion indicating an address of an originating communication control unit and a signal kind indicating portion indicating whether the signal is a transmission request or an acknowledge signal;

switch means for enabling signal transmission and reception between a selected one of interfaces and the communication network through said transmitter/receiver means in a first state and for disabling the signal transmission and reception between the selected one of the interfaces and the communication network through said transmitter/receiver means in a second state; and control means comprising address discriminating means for discriminating whether or not an address indicated by the destination address portion of the signal received from the communication network through said transmitter/receiver means coincides with an address of said communication control unit, signal kind discriminating means for discriminating the kind of the signal received from the communication network through said transmitter/receiver means, selecting means for selecting a desired one of the interfaces coupled to said communication control unit and signal detecting means for detecting whether or not a signal received from the communication network through said transmitter/receiver means is intended for the selected one of the interfaces coupled to said communication control unit based n a discrimination made in said address discriminating means, said control means controlling said switch means to the first state only when said address discriminating means discriminates that the two addresses coincide and said signal kind discriminating means discriminating that the signal received is a transmission request signal when receiving the signal from the communication network through said transmitter/receiver means, and controlling said switch means to the first state only when said address discriminating means discriminates that the two addresses coincide and said signal kind discriminating means discriminates that the signal received is an acknowledge signal when transmitting the signal to the communication network through said transmitter/receiver means.

15. A communication control unit as claimed in claim 14 in which the plurality of terminals include different kinds of terminals using different protocols.

16. A communication control unit as claimed in claim 14 in which the terminals are selected from a group at least comprising a computer and a printer.

* * * * *